United States Patent [19]

Nakayama et al.

[11] 4,420,986
[45] Dec. 20, 1983

[54] SLIDING SHOE FOR A ROTATABLE SWASH-PLATE TYPE REFRIGERANT GAS COMPRESSOR

[75] Inventors: Shozo Nakayama; Kimio Kato, both of Kariya; Tusneo Sugiura, Hekinan; Yoshio Kato, Toyota; Mikio Shugiura, Okazaki; Keiichiro Otu, Toyota, all of Japan

[73] Assignees: K. K. Toyoda Jidoshokki Seisakûsho; Taihou Kogyo Kabushiki Kaisha, both of Tokyo, Japan

[21] Appl. No.: 231,461

[22] Filed: Feb. 4, 1981

Related U.S. Application Data

[63] Continuation of Ser. No. 953,917, Oct. 23, 1978, abandoned.

[30] Foreign Application Priority Data

Nov. 1, 1977 [JP] Japan .................................. 52-130979
Nov. 1, 1977 [JP] Japan ........................... 52-146487[U]
Nov. 1, 1977 [JP] Japan ........................... 52-146488[U]

[51] Int. Cl.³ .............................................. F16H 23/00
[52] U.S. Cl. ...................................... 74/60; 308/3 C; 417/269; 428/645
[58] Field of Search .......................... 428/645; 417/269; 91/488, 506; 308/3 C; 74/60

[56] References Cited

U.S. PATENT DOCUMENTS

| 2,770,031 | 11/1956 | Schluchter | 428/645 |
| 3,075,472 | 1/1963 | Garnier | 91/506 |
| 3,863,997 | 2/1975 | D avis | 91/488 |
| 3,955,899 | 5/1976 | Nakayama et al. | 417/269 |
| 4,018,137 | 4/1977 | Fricke et al. | 91/488 |
| 4,037,522 | 7/1977 | Inoshita | 92/71 |

FOREIGN PATENT DOCUMENTS

| 1300830 | 8/1969 | Fed. Rep. of Germany | 417/269 |
| 711373 | 6/1954 | United Kingdom | 428/645 |

Primary Examiner—Peter K. Skiff
Attorney, Agent, or Firm—Burgess, Ryan & Wayne

[57] ABSTRACT

Disclosed is a sliding shoe for a rotatable swash-plate type refrigerant gas compressor. This shoe is slidably connected between a rotatable swash-plate and a ball rotatably engaged with a piston. One of the major surfaces of the shoe slidably contacts a sliding surface of the swash-plate. A sliding surface of the shoe facing the swash-plate is formed with a flat plane at its center portion and chamfered surface at the remaining portion of the sliding surface. At least the sliding plane of the shoe is coated with a lead alloy. According to the present invention, even if the swash-plate type compressor has no lubrication, abrasion and seizing of the shoe can be reduced to a great extent.

10 Claims, 16 Drawing Figures

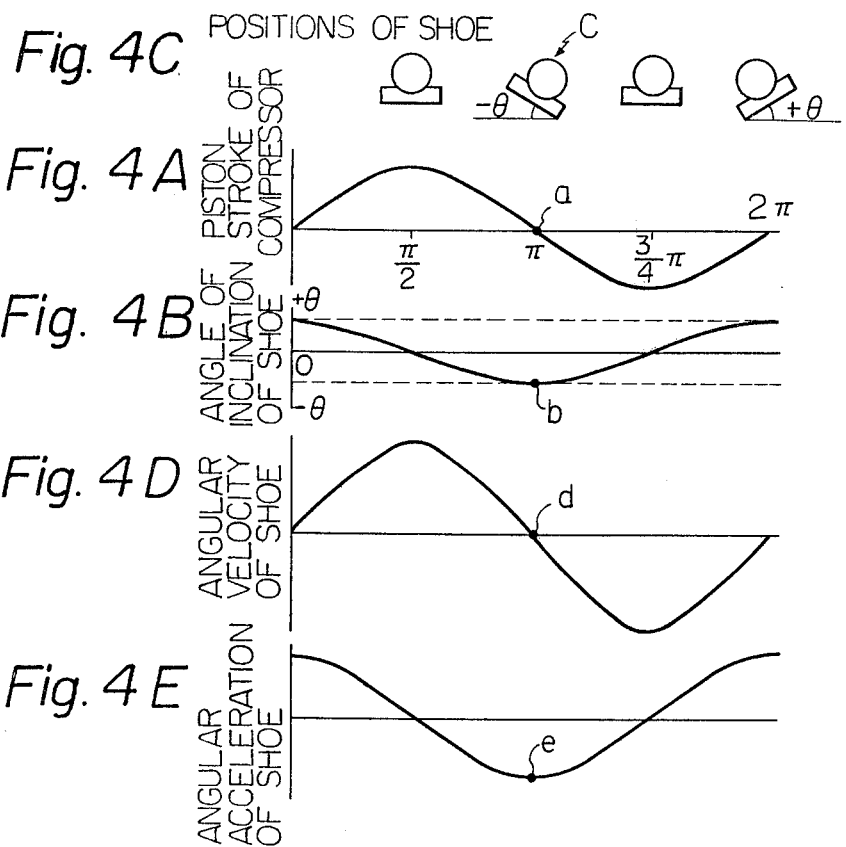
Fig. 4C POSITIONS OF SHOE
Fig. 4A PISTON STROKE OF COMPRESSOR
Fig. 4B ANGLE OF INCLINATION OF SHOE
Fig. 4D ANGULAR VELOCITY OF SHOE
Fig. 4E ANGULAR ACCELERATION OF SHOE
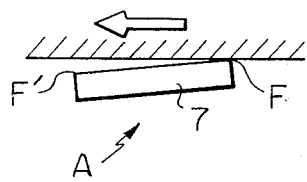
Fig. 5A
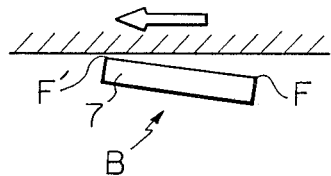
Fig. 5B

SLIDING SHOE FOR A ROTATABLE SWASH-PLATE TYPE REFRIGERANT GAS COMPRESSOR

This is a continuation of application Ser. No. 953,917, filed Oct. 23, 1978, abandoned.

BRIEF DESCRIPTION OF THE INVENTION

The present invention relates to a sliding shoe used for a swash-plate type compressor and, more particularly, relates to a sliding shoe for a rotatable swash-plate type refrigerant gas compressor for use in an air conditioning system for land vehicles.

U.S. Pat. No. 3,352,485 of Akira Niki et al., U.S. Pat. No. 3,750,848 of Shozo Nakayama, U.S. Pat. No. 3,801,227 of Shozo Nakayama and U.S. Pat. No. 3,955,899 of Shozo Nakayama et al., disclose a rotatable-swash-plate refrigerant gas compressor. The compressors of the type disclosed in the above-mentioned Patents are provided with a suitable number of cylinder bores, and pistons slidably engaged in each of the cylinders, steel balls fitted in spherical recesses of the pistons, a rotatable swash-plate and slidable shoes arranged between the steel balls and the swash-plate.

As shown in FIG. 1, the swash-plate compressor includes, in general, pistons 3' which are slidably fitted in cylinder bores 2', provided in a cylinder block 1', and a swash-plate 5' made of a steel alloy or aluminum alloy secured integrally with a rotatable shaft 4' at a predetermined inclined angle thereto. When the swash-plate 5' is rotated together with the shaft 4', the swash-plate 5' provides a reciprocating motion of the piston 3' so as to effect compression of a refrigerant gas in the cylinder bores 2'.

Balls 6' are rotatably fitted in the spherical recess provided in the pistons 3'. Usually, slidable shoes 7' are arranged between the balls 6' and the swash-plate 5'. Each of the shoes 7' is provided with a spherical recess at one major surface thereof which receives one portion of the ball 6' and a flat plane at the opposite major surface thereof which slidably contacts the sliding surface of the swash-plate 5' via a lubricating-oil film.

BACKGROUND OF THE INVENTION

The above-described swash-plate type compressor is required to be compact and lightweight, and be capable of high speed performance up to 6,000 r.p.m. When the compressor is used for air conditioning of a vehicle, the compressor must be capable of operation for a long period of time irregardless of the ambient temperature. When the compressor utilizes a spray type oil supply system, in which the lubricating oil is supplied by the refrigerant gas, instead of utilizing a conventional oil supply pump for supplying lubricating oil to the sliding parts inside the compressor, if the starting or low-speed and light-load running of the compressor is activated, the sliding surface of the compressor is placed in a state where said sliding surface is supplied with no lubricating oil or with only a negligible amount of lubricating oil. This is due to the small amount of oil carried by the small amount of refrigerant gas. At such time, the compressor will be subjected to considerable difficulties, for example, abrasion and seizure of the shoe. In addition, movement of the shoe is complicated and the theory of oil distribution on the sliding surface between the shoe and the swash-plate has not been fully accomplished. Therefore, the above described difficulties cannot be obviated at the present time.

MOVEMENT OF THE SHOE

Now, let us consider the movement of the shoe on the swash-plate of the conventional swash-plate type compressor. Such movement of the shoe can be divided into the following three kinds, i.e., a reciprocating movement in the axial direction of the swash-plate, a sliding movement in an elliptical circumferential direction along the inclined surface of the swash-plate and any swivel movement responsive to alternating position changes of the swash-plate. However, since the distance of the sliding movement along the circumferential direction is much larger than that of the reciprocating movement in the axial direction of the swash-plate, the majority of the abrasion of the shoe will be the abrasion caused by the sliding movement. Therefore, hereinafter, we will mainly refer to the sliding movement in the circumferential direction.

As a result of experiments conducted by the inventors of the present invention, it has been found that, during at least one revolution of the swash-plate, the shoe alternatingly changes its position from a position of a positive angle of attack of $+\theta°$ to a position of a negative angle of $-\theta°$, as shown in FIG. 4C. In FIGS. 4A, 4B, 4D and 4E, the abscissas indicate the revolution angle of the swash-plate, while the ordinate of FIG. 4A, 4B, 4D and 4E indicates the piston stroke, the angle of inclination of the shoe in the direction of revolution of the swash-plate, the angular velocity of the shoe and the angular acceleration of the shoe, respectively.

At point a (the mid point between top dead center and bottom dead center of the piston stroke) the angle of inclination of the shoe equals $-\theta°$ (at point b in FIG. 4B). In such a case the position, angular velocity and angular acceleration of the shoe is respectively indicated by point c in FIG. 4C, point d in FIG. 4D and point e in FIG. 4E.

That is to say, the angle of inclination of the shoe in the direction of revolution of the swash-plate changes from $-\theta°$ to $+\theta°$ in one half of a revolution and from $+\theta°$ to $-\theta°$ in the succeeding one half of the revolution of the swash-plate. The angular velocity in FIG. 4D is indicated by a sine curve. The value of angular acceleration in FIG. 4E reaches a maximum at a mid point and reaches a minimum at each of the top and bottom dead centers of the piston stroke. Since the angular velocity changes alternatingly the position of shoe is also alternatingly changed from position A (as shown in FIG. 5A) to position B (as shown in FIG. 5B). At position A the leading edge F of the shoe is approaching the swash-plate and at position B, the leading edge F is separating from the swash-plate. In position A, the lubricating oil is scraped by the leading edge of the shoe, and metal-to-metal contact readily occurs between the shoe and the swash-plate. Naturally, in such a case, seizure between the shoe and the swash-plate is caused. In position B, if the lubricating oil remains on the swash-plate, the trailing edge F' of the shoe is raised as described hereinafter. In FIGS. 5A and 5B, the angle of inclination of the shoe is exaggerated, and in practical use it is quite small.

MOVEMENT OF THE SHOE ON THE OIL FILM

FIGS. 6 and 7 illustrate the pressure distribution of the oil film on different kinds of shapes of the shoe.

Table 1 illustrates the loading capacity of the oil and the maximum pressure of the oil film.

TABLE 1

| Shape of shoe | Loading capacity of oil film (kg) | | Available max. pressure of oil film (kg/cm$^2$) | Note |
|---|---|---|---|---|
| | Parallel arrangement | Inclined arrangement | | |
| (a) flat | 0 | 167 | 246 | passable unstable at the starting time |
| (b) convex | 104 | 156 | 310 | good stable |
| (c) concave | 22 | 29 | 100 | no good unstable |

Diameter of shoe = 18 mm
Parallel arrangement:
   $\alpha = 0°$ (the shoe is parallel to the swash-plate)
   Minimum thickness of the oil film = 1$\mu$
Inclined arrangement:
   $\alpha = 7°$ (the shoe is inclined at an angle of 7° with respect to the swash-plate)
   6$\mu$ thickness of the oil film at the inlet and 0.8$\mu$ thickness at the outlet formed between the shoe and the swash-plate
Height of convex = 5$\mu$
Depth of concave = 5$\mu$ The following is evident from Table 1.

When the shoe has a concave shape, the maximum pressure of the oil film and the loading capacity are very low, so that it cannot be applied in practical use. Also, the stability of the position of the shoe is poor. When the shoe has a flat shape, if the shoe is inclined to the swash-plate, the center of the pressure distribution of the oil film will aproach the trailing edge of the shoe so as to raise the trailing edge of the shoe. In the case where the shoe has a convex shape, the maximum pressure of the oil film is higher than in the above mentioned two cases. In the case where the shoe has a convex shape, the loading capacity is relatively large and the center of the pressure distribution of the oil film is situated in front of the center of the shoe. As a result, a raising force is caused on the leading edge of the shoe, so as to prevent the tendency of the leading edge of the shoe to approach the swash-plate.

SHAPE OF THE SHOE

The chamfered shoe, which is one kind of convex shoe, will now be described in more detail with reference to FIGS. 8 and 9.

The sliding surface of the shoe facing the swash-plate includes a substantially flat plane at its central portion and a chamfered surface at its outer periphery portion. The width L of the chamfered surface and the projection of the width L form an included angle $\alpha$ therebetween. As shown in FIG. 8, when the leading edge of the shoe is approaching the sliding surface of the swash-plate, a pressurized oil film is generated on the surface of the chamfered portion and raises the leading edge of the shoe. As a result, the position of the shoe shown in FIG. 8 will change to the position as shown in FIG. 9, in which the leading edge of the shoe is separated from the swash-plate. In the position of shoe shown in FIG. 9, a pressure which is larger than the pressure applied to the chamfered portion is applied to the rear portion of the sliding plane. Therefore, the resultant pressure of the smaller and larger pressures will serve as the restoring force which restores the position of the shoe (shown in FIG. 9) to its initial state. In other words, the position of shoe shown in FIG. 8 is readily changed to the position shown in FIG. 9 and vice versa, which results in good stability of the shoe position. As a result, the scraping of the oil on the swash-plate and metal-to-metal contact between the shoe and the swash-plate, which are caused by the shoe approaching the swash-plate and which were inevitable in the conventional shoes, can be almost prevented.

COATING OF THE SHOE

As described previously, in the case of the starting or low-speed and light-load running of the compressor, the sliding surface is occasionally placed in a state where said sliding surface is supplied with no lubricating oil or with only a negligible amount of lubricating oil. This is caused by the small amount of refrigerant gas flow which carries the lubricating oil in a spray condition. As a result of reaching such a state, abrasion of the shoe may be caused by metal-to-metal contact which, in turn, results in shortening the shoe life.

In order to eliminate the above described drawbacks, different kinds of material for the shoe have been proposed, for instance, casting aluminum alloy with silicone, small amounts of manganese and copper added, or copper alloy with aluminum and steel added. Recently, a shoe having a back plate made of steel and a coating layer made of sintered copper alloy has been developed. Such a copper coating is applied only on the sliding surface between the shoe and the swash-plate.

High speed sliding, and the anti-abrasion and anti-seizure properties of the shoe under normal running conditions were very much improved by the above described materials. However, it has been found that such materials still cannot withstand the abrasion and seizure of the shoe, which are caused at the time of starting or low-speed and light-load running of the compressor.

According to the present invention, a base plate is secured on a backing plate having a suitable strength. After the base plate of the shoe has been ground by a suitable grinding machine or tool, the surface of the base plate facing the swash-plate is coated to a predetermined thickness with a lead alloy by means of electric plating or the like. It is quite easy to control the thickness of plating by controlling the current density and current flowing period. It has been found that, when the coating is too thin, the coated layer is apt to be worn out quickly, which decreases the lubricating effect, and when the coated layer is too thick, separation or abnormal abrasion of the coated layer will occur. However, reports of the later phenomenon regarding coating have apparently not been published to date.

After many experiments the inventors of the present invention have found the suitable thickness range of the coating. The experimental results of the inventors can be explained as follows. Table 2 illustrates the thickness of lead alloy before and after a running test.

TABLE 2

| Thickness of lead coating | | Amounts of | |
|---|---|---|---|
| Before test | After test | abrasion | Note |
| 4–5μ | 3–4μ | about 1μ | minor abrasion |
| 10–12μ | 7–9μ | about 3μ | minor abrasion |
| 19–21μ | 7–10μ | about 12μ | much separation |

Number of revolution of the swash-plate = 5500 r.p.m.
Mean exhaust pressure of the refrigerant gas = 20 kg/cm²
Mean suction pressure of the refrigerant gas = 3 kg/cm²
Operation period = 400 Hrs The test was accomplished during intermittent-running, namely a 25 sec. run and a 5 sec. stop.

What can be concluded from Table 2 is as follows:

As the coating is subject to abrasion by a few μ at the starting of the compressor, the coating should be provided with more than 3μ in thickness. On the other hand, and, in order to prevent separation from the base plate, the coating should be provided with less than 15μ in thickness.

A lead alloy coating with a thickness between 3μ and 15μ will be affected by the frictional heat of sliding, which causes a plastic flow of the lead under a high oil pressure during running. This results in a smooth sliding of the shoe. In this case, some amount of lead is separated from the coating and sticks on the swash-plate surface.

When the sliding surface of the swash-plate is smoothed by the above mentioned breaking-in, a satisfactory oil film on the sliding surface can be formed with small amounts of oil. Thus, the discontinuous oil film phenomenon, which usually is seen in the conventional swash-plate type compressor, can be eliminated. Consequently, as described above, the shoe of the present invention can satisfactorily withstand very severe use.

COMBINATION OF SHAPE AND MATERIAL OF SHOE

Table 3 illustrates the combination of different kinds of shapes and materials used for the shoe.

TABLE 3

| Shape of shoe | Volume of oil (c.c.) | | | | | | |
|---|---|---|---|---|---|---|---|
| | 280 | 260 | 240 | 220 | 200 | 180 | 170 |
| Flat | o | X | X | X | X | X | X |
| Convex | o | o | X | X | X | X | X |
| Flat.lead coated | o | o | o | o | X | X | X |
| Convex.lead coated | o | o | o | o | o | o | o | marks
o ... passable
X ... seizing

Total exhausting volume of the compressor = 170 c.c.
Number of revolution of the swash-plate = 750 r.p.m.
Mean exhaust pressure of the refrigerant gas = 17.5 kg/cm²
Mean suction pressure of the refrigerant gas = 0.7 kg/cm²
Thickness of the lead alloy coating on the base plate = 3μ–15μ
Operation period = 5 Hrs What can be concluded from Table 3 is as follows:

(1) In the case where a flat or convex shoe without lead alloy coating is used, the shoe will cause seizing at a lubricating oil volume of less than 260 c.c. or 240 c.c., respectively.

(2) In the case where a flat shoe coated with a lead alloy is used, the shoe will cause seizing at less than 200 c.c.

(3) In the case where a convex shoe coated with lead alloy is used, the shoe will not cause seizing at a lubricating oil volume of 170 c.c.

OBJECTS OF THE INVENTION

It is a primary object of the present invention to obviate the above mentioned disadvantages by providing an improved structure of a sliding shoe of a swash-plate type compressor.

Another object of this invention is to provide a sliding shoe, wherein seizing of the shoe can be reduced.

Still another object of this invention is to provide a sliding shoe, wherein even in the state of almost no lubrication on the sliding surface of the shoe, the lubricity on the sliding surface can be maintained.

A further object of this invention is to provide a sliding shoe, wherein anti-abrasion and durability of the shoe are considerably improved over those of a conventional shoe.

The above objects are accomplished by the provision of a sliding shoe for a rotatable swash-plate type refrigerant gas compressor, wherein said shoe is slidably connected between a swash-plate secured to a rotatable shaft at a predetermined inclined angle thereto and a ball rotatably engaged with a piston which effects compression of refrigerant gas by means of rotation of the swash-plate; according to the invention said shoe has a comparatively flat shape including a sliding plane which cosely slides on the sliding surface of the swash-plate, the outer periphery of the sliding plane of the shoe facing the swash-plate is chamfered, at least said sliding plane of the shoe is coated with a lead alloy, the height H, the width L and the angle α of the chamfered portion are respectively more than 5μ, from 0.5 to 2 mm and less than 10°, respectively, and the thickness of the lead alloy coating is 3 to 15μ.

BRIEF DESCRIPTION OF THE DRAWINGS

Further objects and advantages of the present invention will become apparent from the ensuing descriptions, reference being made to the accompanying drawings, wherein:

FIGS. 4A, 4B, 4D and 4E are diagrams of a piston-stroke of the compressor, an inclined angle of the shoe, an angular velocity and an angular velocity of acceleration of the shoe, respectively, according to the present invention;

FIG. 4C illustrates positions of the shoe corresponding to the above mentioned FIGS. 4A, 4B, 4D and 4E, respectively;

FIGS. 5A and 5B are schematic side views illustrating properties of the conventional shoe;

PREFERRED EMBODIMENTS OF THE INVENTION

Figure 1:
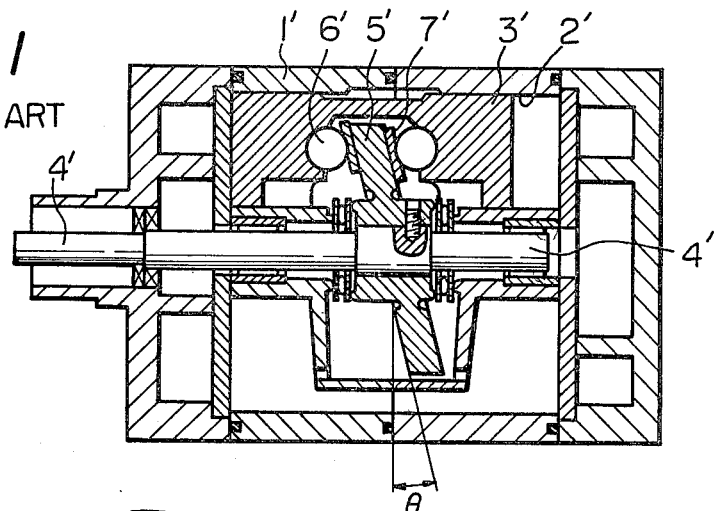
FIG. 1 is a cross-sectional view of a conventional swash-plate type compressor.

Preferred embodiments of the invention will now be described in detail with reference to the accompanying drawings, wherein the same reference numerals without dashes are used to designate similar parts as illustrated in FIG. 1 of the prior art, throughout the several views.

Figure 2:
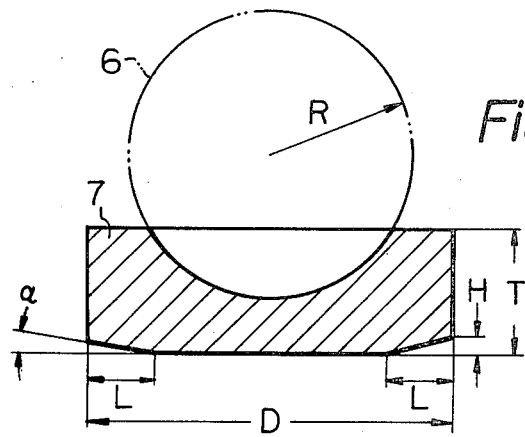
FIGS. 2 and 3 are cross-sectional and plan views, respectively, of the shoe of the present invention.
Figure 3:
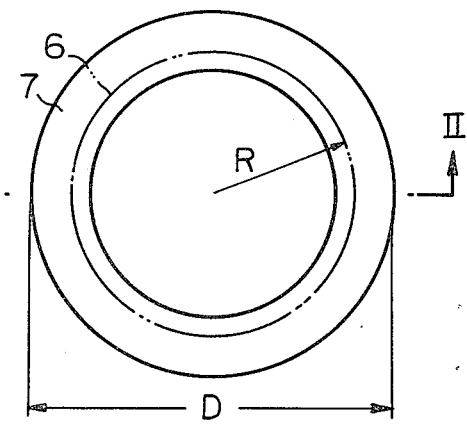
Figure 6:
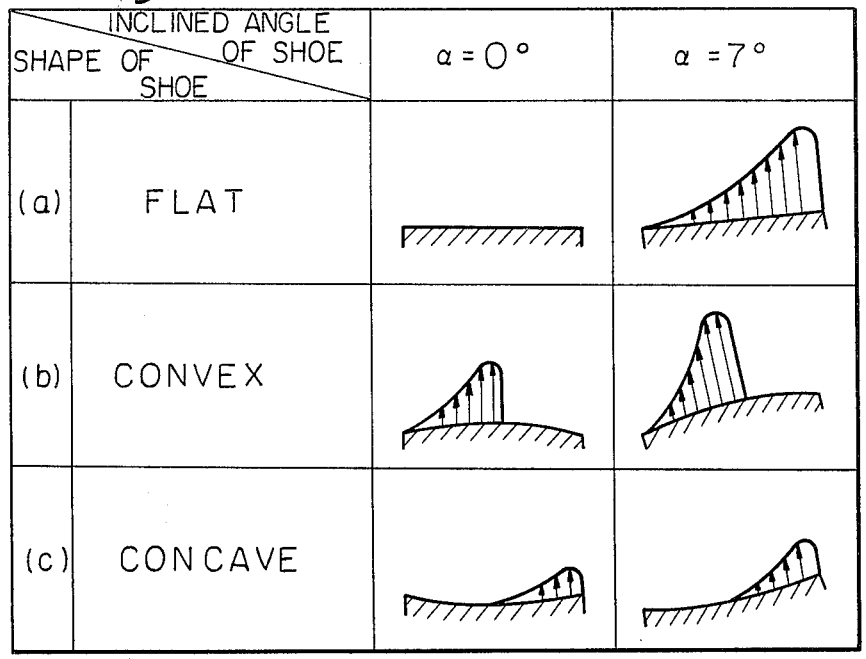
FIG. 6 is pressure distribution diagrams of the oil film on different kinds of shapes and positions of circular disc shoes, according to the present invention.
Figure 7:
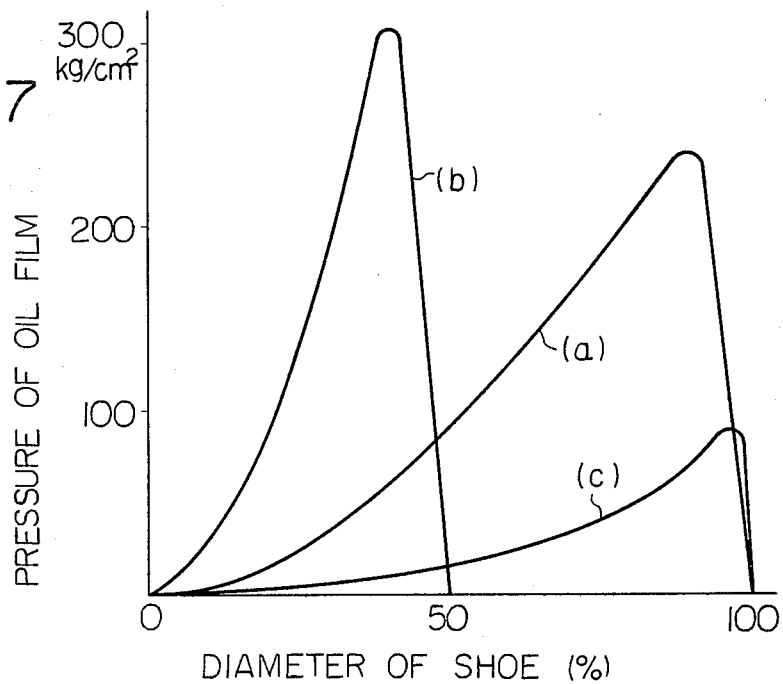
FIG. 7 is a summarized diagram of FIG. 6.
Figure 8:
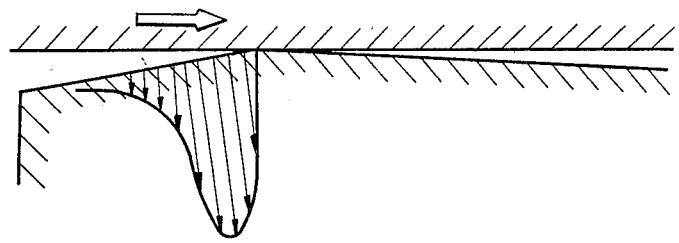
FIGS. 8 and 9 illustrate pressure distribution of the oil film between the shoe and the swash-plate in two positions of the present invention.
Figure 9:
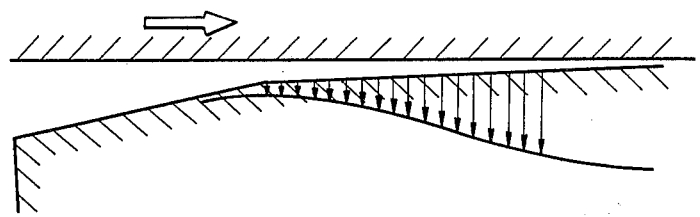

FIGS. 2 and 3 indicate a shoe 7 substantially in the form of circular disc having a diameter D and a height T. The shoe 7 contacts a ball 6 (steel ball) rotatably fitted in the shoe at a recess provided on one of the major surfaces thereof. The radius of the recess is substantially the same as that of the ball 6. It should be noted that the lower surface of the shoe 7 facing a swash-plate 5 is chamfered by a width L, height H and angle $\alpha$. In this embodiment, L is 1.5 mm, H is 50$\mu$, $\alpha$ is 1.9°, D is 18 mm and T is 5 mm.

The fundamental condition of the shoe construction is as follows.

(1) The surface of the shoe facing the swash-plate has a convex form.

(2) The middle portion of said convex surface of the shoe is a flat plane.

(3) The chamfer of the shoe is formed by a side L, a hypotenuse and an included angle $\alpha$.

What is concluded from experiments conducted by the inventors of the present invention is as follows: The preferable value of the angle $\alpha$ is less than 10°, and a more preferable range of the value of the angle $\alpha$ is between 0.5° to 5°. The range of the width L is 0.5 mm to 2 mm. In such a case, height of the shoe H is 5$\mu$ and the range of the shoe diameter is from 12 to 24 mm. In order to maintain the minimum thickness of the oil film at between 1$\mu$ to 3$\mu$, in various positions of the shoe, the value of H should be more than 5$\mu$. Since, as the value of L increases, the oil pressure to the chamfered portion of the shoe will suddenly increase, the allowable range of L is between 0.5 to 5 mm.

As the angle $\alpha$ becomes more than 10°, generation of the oil film within the chamfered gap becomes difficult and, as a result, the raising action of the shoe becomes doubtful. It is desirable that the angle $\alpha$ be small; however, an angle $\alpha$ which is too small cannot withstand the necessary variation of shoe position.

Figure 10:
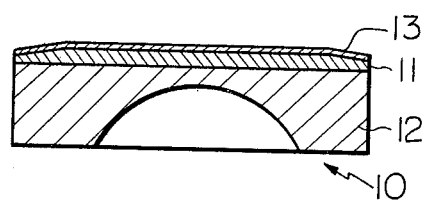
FIG. 10 is a enlarged vertical sectional view of the shoe of the present invention.

In FIG. 10, which illustrates another embodiment of the present invention, a shoe 10 includes a base plate 11 made of, for example, a copper base alloy with 24% lead and 4% tin, which covers one side of a backing plate 12 made of, for example, steel.

Figure 11:
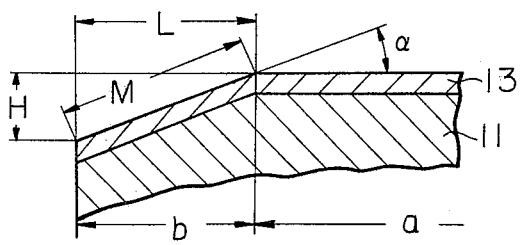
FIG. 11 is an enlarged fragmentary vertical sectional view of the shoe illustrated in FIG. 10.

As illustrated in FIG. 11 the central portion a of the base plate 11 is formed as a flat plane and the outer periphery portion b of the central portion is chamfered in the form of a triangle. The flat portion a, or the flat portion a and the chamfered portion b of the base plate 11, are coated by means of electric plating with a lead alloy. The thickness range of this coating layer 13 is between 3 to 15$\mu$. The coating layer 13 fully protects the sliding surface of the shoe, and some amount of lead which is separated from the coating layer 13 sticks on the corresponding swash-plate surface, so as to improve the adaptability of the shoe to the swash-plate surface. According to the present invention, since the base material of the base plate 11 is made of a ductile copper alloy plated with a lead alloy, in the event of the wearing-out of the lead alloy, the base plate 11 of copper alloy and the copper stuck to the corresponding swash-plate surface will serve to prevent the seizing of the shoe for a while.

According to circumstances, the backing plate 12 may be omitted. A copper alloy, aluminum alloy, steel alloy with small amounts of lead and tin, or a sintered steel alloy with small amounts of lead and tin, may be preferably used for the base plate 11. A lead base alloy with 10% tin and 2% copper may be preferably used for the lead coating layer 13.

Although illustrative embodiments of the present invention have been described in detail herein with reference to the accompanying drawings, it is to be understood that the invention is not limited to those precise embodiments, and that various changes and modifications may be effected therein by one skilled in the art without departing from the scope or essential characteristics of the invention. For example, the external form of the shoe is not limited to a circular outline but can have different outlines. Further, in the described embodiments, the entire sliding surface is formed as a flat plane, but the sliding surface may be formed with a flat plane at its center portion and a chamfered surface with a large curvature at the remaining portion. In addition, a cross-sectional view of the chamfered portion including the axis of the shoe does not always show it being formed by straight lines and it may be formed by convexed lines with large curvature. Furthermore, the boundary area between the chamfered portion and the outer periphery of the shoe may be rounded and have a suitable radius.

According to the present invention, seizing of shoe of the swash-plate type compressor caused by the violent movement of the shoe, which is peculiar to the shoe of the swash-plate type compressor, can be prevented by means of the position restoring action of the shoe due to the convexity and chamfer of the shoe. In addition, even in the state of almost no lubrication, i.e., in the state of metal-to-metal contact between the shoe and the swash-plate, lubricity on the sliding surface can be maintained by the lead alloy coating layer. Furthermore, the present invention can provide an unexpected excellent anti-seizing property of the shoe, due to the special combination of the shape and the coating of the shoe, as illustrated in Table 3. Such excellent anti-seizing effect cannot be expected from the either the shape or the coating of the shoe individually.

What is claimed is:

1. In a sliding shoe for a rotatable swash-plate type refrigerant gas compressor, in which said shoe is slidably connected between a swash-plate secured to a rotatable shaft at a predetermined inclined angle thereto and a ball rotatably engaged with a piston which effects compression of refrigerant gas by means of rotation to the swash-plate, the improvement wherein said shoe has a configuration substantially in the form of a circular disc having a swash-plate engaging surface with a major portion of said surface including a sliding plane for slidably engaging the sliding surface of the swash-plate, said shoe having a lubrication-enhancing surface slightly inclined with respect to the sliding plane within a predetermined distance from the outer periphery of the shoe, so that the cross section of the shoe, through a plane including the axis thereof, is chamfered in a substantially triangular shape having a predetermined angle between the lubrication-enhancing surface and the sliding plane, in such a way that the height H, the width L and the angle $\alpha$ of the chamfered portion are more than 5μ, from 0.5 to 2 mm and less than 10°, respectively.

2. In a sliding shoe for a rotatable swash-plate type refrigerant gas compressor, in which said shoe is slidably connected between a swash-plate secured to a rotatable shaft at a predetermined inclined angle thereto and a ball rotatably engaged with a piston which effects compression of refrigerant gas by means of rotation of the swash-plate, the improvement wherein said shoe has a configuration substantially in the form of a circular disc having a swash-plate engaging surface with a major portion of said surface including a sliding plane for slidably engaging the sliding surface of the swash-plate, the outer periphery of the sliding plane of the shoe facing the swash-plate is chamfered and at least said sliding plane of the shoe is coated with a lead alloy, in such a way that the height H, the width L and the angle α of the chamfered portion are more than 5μ, from 0.5 to 2 mm and less than 10°, respectively, and the thickness of the lead alloy coating is 3 to 15μ.

3. A sliding shoe according to claim 2, which includes a base plate comprising aluminum alloy and silicon.

4. A sliding shoe according to claim 2, which includes a base plate comprising copper alloyed with another metal comprising lead or tin.

5. A sliding shoe according to claim 2, which includes a base plate comprising copper alloy and a backing plate comprising steel alloy which is secured to the base plate.

6. A sliding shoe according to claim 5, wherein the copper alloy is formed by sintering.

7. A sliding shoe according to claim 2, wherein said lead alloy coating is applied by electroplating.

8. A sliding shoe according to claim 2, wherein the lead alloy coating is applied by deposition.

9. A sliding shoe according to claim 1, wherein said sliding plane is convex toward said sliding surface of the swash-plate.

10. A sliding shoe according to claim 2, wherein said sliding plane is convex toward said sliding surface of the swash-plate.

* * * * *